Nov. 17, 1959 B. COX ET AL 2,913,705

STORAGE SYSTEM

Filed Jan. 10, 1955 2 Sheets-Sheet 1

INVENTORS
BONNAR COX
JACOB GOLDBERG
BY Lyon & Lyon
ATTORNEYS

Nov. 17, 1959 B. COX ET AL 2,913,705

STORAGE SYSTEM

Filed Jan. 10, 1955 2 Sheets-Sheet 2

INVENTORS
BONNAR COX
JACOB GOLDBERG
BY Lyon & Lyon
ATTORNEYS

United States Patent Office 2,913,705

Patented Nov. 17, 1959

2,913,705

STORAGE SYSTEM

Bonnar Cox and Jacob Goldberg, Palo Alto, Calif., assignors, by mesne assignments, to General Electric Company, New York, N.Y., a corporation of New York Application January 10, 1955, Serial No. 480,870

11 Claims. (Cl. 340—174)

This invention relates to temporary storage systems and, more particularly, to an improved temporary storage system employed in the transfer of data recorded on a first magnetic tape to a second magnetic tape.

A large number of present-day digital computers employ magnetic tapes as a memory or storage device. In the operation of such computers, numerous occasions arise wherein it is desirable to transfer data stored on one tape to another tape. This may occur, for example, when the data on one tape is being merged or collated with data on a second tape, or when a sorting operation occurs wherein data from several tapes is successively or in any predetermined order entered or rewritten onto a new magnetic tape. In such a transfer, many problems arise. For example, it may be desired to allot different space to the data being rewritten or different spacing between items of such data to either pack the data more compactly or spread it, or provide space for insertion of other data. It was found at an early date that a direct transfer of data from a first to a second tape was difficult. Synchronization of the tape speed is difficult. Tapes have a tendency to skew—that is, one side of the tape can stretch more than the other. This causes binary data written in side-by-side fashion to be read successively and recorded successively. Thus, the chances for erroneous read-out materially increased, since skew with two tapes can be cumulative. Furthermore, data is not being stored campactly. Thus, a temporary or buffer storage is required for the transfer of data between two tapes.

The present invention is directed to an improved form of temporary storage system.

Another feature of the present invention is the provision of apparatus for the efficient employment of the storage capacity in the temporary store.

Still another feature of the present invention is the elimination of troubles due to tape skew or tape-speed variations.

Still another feature of the present invention is the provision of novel, useful, and efficient apparatus for transferring data from a first to a second tape.

These and other features of the invention are achieved in a system wherein a plurality of stepping registers are provided. A first and a second counter are also provided, each counter having as many different count conditions as there are registers. Each count condition is associated with a different one of the registers. Accordingly, any one register will have associated therewith a count condition of the first counter and a count condition of the second counter. Data from the first tape is entered into a register which is associated with the count condition manifested by the first counter. The entry into the register is timed by a clock pulse which controls a shift-pulse generator which steps the register along. At the end of a predetermined amount of data being transferred into the register, the first counter is transferred to its succeeding count condition by a signal manifested at the end of such data and by the second counter being in a count condition which is not associated with the register associated with the succeeding count condition of the first counter. Filling of the registers continues until such "end-of-data" signal is again received, at such time that the count condition of the second counter is one which is associated with the register succeeding the one with which the count condition of the first counter is associated. At this time, filling of the registers from the first tape is stopped, the first tape is marked to indicate the point of stoppage, is then reversed, and any previous mark which may be in the immediate vicinity indicating a previous point of stopping is erased. The tape is then instructed to stop. Meanwhile, the data in the one of the registers associated with the count condition of the second counter is transferred out and written onto the new tape. The count condition of the second counter is advanced upon (1) receiving a signal indicative of the end of the data being transferred from a register, and (2) if the count condition from which the second counter is to be transferred is not associated with a register which is associated with the count condition manifested by the first counter. Thus, the data is successively transferred out of the registers until such time as the count conditions manifested by the second counter and the first counter are both associated with the same register. When this occurs, at the end of the writing of the register data to the second tape, a signal is provided which stops the running of the second tape momentarily and initiates the forward motion of both tapes, and resumes transfer of data from the first tape into the registers again. The transfer out of data from the registers is synchronized by the clock pulses. Thus, the data is written on the second tape, free of any skew effects, defects to pulse shapes, etc., which can occur in the process of the transfer. This mode of operation permits flow of data into the buffer storage at the same time data is emptied, resulting in a continuous flow of data in blocks much larger than the storage capacity of the buffer itself.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
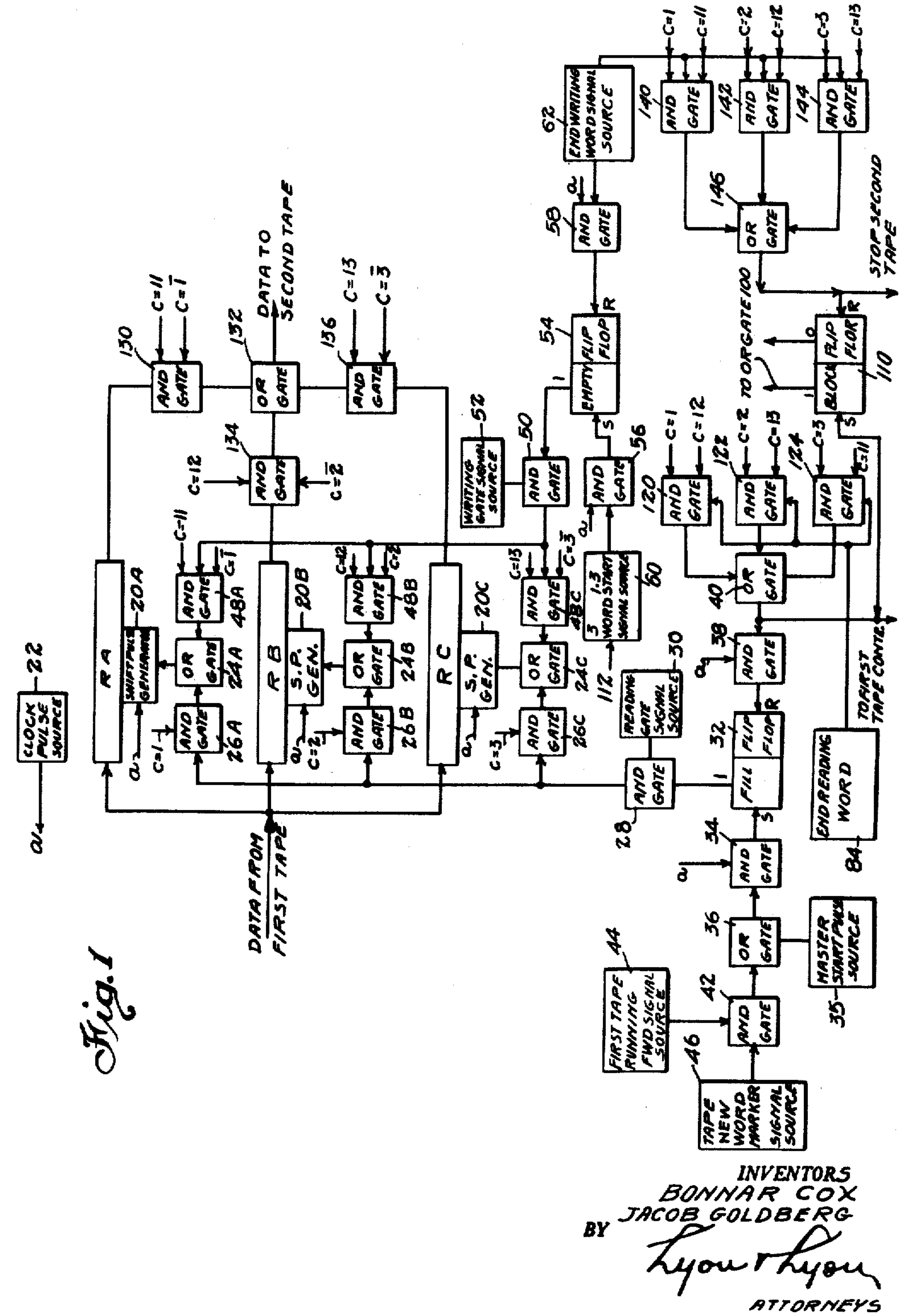
Figure 1 is a block diagram of an embodiment of the invention.

At the outset, the tape containing the data to be transferred is designated as the first tape. The tape to receive the data is designated as the second tape. It will be appreciated that there is required for the transfer of data from one tape to a second tape mechanism for controlling the direction of travel of the tapes, stopping mechanism, tape reading heads, tape writing heads, erasing apparatus, and the associated reading and writing amplifiers. All of this is well known and commercially obtainable. For the purposes of this invention, the fact that the first tape is running in a forward direction should be manifested by a signal designated as a "tape-running-forward" signal. A flip-flop which is triggered to one state when a control signal is applied to run the first tape forward and is triggered to a second state otherwise can readily provide this signal. With respect to the data stored on the tapes, it is preferred that this data be stored in the binary form, which may either be the presence or absence of magnetic recording, or a positive or negative magnetic recording, as desired. The data may be stored on the tape as words in serial form or as words in parallel tracks. This merely affects the number of registers simultaneously employed to transfer data but does not alter the operation of the invention.

The data on the tape must be recorded in a manner to provide an "end-of-word" signal—that is, when a number of data digits which represent a word have been read from the first tape, the end thereof should be indicated either by a signal being recorded on the tape in the same track or on an extra track on the tape. With fixed word lengths, this may be a time-derived signal or one obtained by counting digits. Any desired number of digits to make up a word may be entered into a register. This merely dictates the length of the register required. The "end-of-word" signal, when read or determined from the first tape, is an "end-of-reading-word" signal and, when written or determined for the second tape, is an "end-of-writing-word" signal. Recognition of such signals may be readily achieved by employment of comparators, or matrices, or other well-known circuits. As previously indicated, these "end-of-word" signals may also be obtained where the number of digits contained in the word is standard by counting either timing pulses or the number of digits in a word and manifesting the end of a count. Also, where standard spacing on tape is given a word, regardless of wordlength, the end of such spacing may be used as an "end-of-word" signal. Provision must be made for marking the end of the last word read from the first tape or the beginning of the next word to be read at a time when data is being written on the second tape and the registers are not available to the first tape. This "new-word" mark can be made in a track alongside of the ones used for recording. Circuitry must be provided to recognize this "new-word" signal. Such word beginning may be marked in the word track itself, besides in an auxiliary track on the tape. Other definitions will be given in the course of the description which follows. The above-mentioned signals are employed in one form or another in standard digital-computer practice, regardless of any requirement for transfer between tapes.

Referring now to Figure 1, by way of exemplification, three registers, RA, RB, and RC, known as shift registers, are shown. Each of these may be a single register or several registers, simultaneously driven side by side, where data is recorded on the first tape in several tracks side by side and is read off simultaneously. A suitable type of shift register is found described in an article in Electronics magazine, November 1949, pp. 181–184, entitled "Gate Type Shifting Register," by Stevens and Knapton. Such a register consists of a number of flip-flop stages connected in tandem. Binary information is entered into one end and is withdrawn from the other end. In order to transfer the information between stages, a shift pulse is required for every stage of transfer. When there is no shift pulse applied, the register is static and no information can go in or out. These shift registers are well known in this art.

In order to facilitate the explanation and to simplify the drawing, arrowheads are shown entering the various rectangular representations of the apparatus which have reference designations attached thereto, such as C=1, C=11, C=3, etc. These are to indicate connections with apparatus represented in other figures of the drawings shown herein. C=1, for example, represents a connection from the first stage output of the first counter shown in Figure 2. $C=\overline{3}$ refers to an output obtained from the first counter when it is not in its third count condition. C=11 refers to an output received from the second counter shown in Figure 3 when it is in its first count condition. The three registers shown in Figure 1 are respectively designated as RA, RB, and RC. Each register is driven or shifted by pulses from its own shift-pulse generator 20A, 20B, and 20C. The shift-pulse generators normally are not operative. In order to become operative, the shift-pulse generators require an output from an Or gate plus a clock pulse from clock-pulse source 22. Clock-pulse source 22 is used to clock the entry of data into the registers, as well as the writing of the data from the registers onto the new tape. Each Or gate which is connected to a shift-pulse generator is designated as 24A, 24B, and 24C. At this point, it may be well to point out that Or gates and And gates, as buffer circuits and coincidence circuits are customarily designated, are well known. Suitable types, for utilization in the embodiment of the invention shown herein, may be found described in chapter 4 of "High-Speed Computing Devices," by the Staff of Engineering Research Associates, published by the McGraw-Hill Book Company. Or, alternatively, these may be found described employing diode logic in an article by Felker, entitled "Typical Block Diagrams for a Transistor Digital Computer," vol. 71, No. 12, December 1952, in the publication Electrical Engineering, published by the McGraw-Hill Company.

The Or gates, as is well understood, are buffer circuits which have a number of inputs and provide an output whenever one of the inputs is excited. The And gates are coincidence circuits which provide an output only when excitation is simultaneously applied to all of their inputs. One input to each one of the respective Or gates 24A, 24B, 24C is respectively provided by And gates 26A, 26B, and 26C. Each of these And gates has two inputs; And gate 26A has an input from a first counter, shown in Figure 2, when in its first counting condition—the other input is received from an And gate 28; And gate 26B also has this latter input as well as another input from the first counter, shown in Figure 2, when in its second counting condition; and And gate 26C has both an input from And gate 28 and from the first counter when in its third counting condition.

The input to And gate 28 consists of a signal from a reading-gate signal source 30 and a signal from a flip-flop 32 when it is in its "set" or "1" condition. The reading-gate signal source is a signal which is generated when data is to be read from the first tape. This may be the signal which enables the reading circuits employed with the first tape each time reading is desired. A fill flip-flop 32 is driven from either of two And gates 34, 38. One And gate 34 which is used to drive the flip-flop to its "set" condition of stability has as its input the output from an Or gate 36 as well as a clock pulse from the source 22. The Or gate 36 is designated as the "Begin Fill" Or gate 36. One input of Or gate 36 comes from the master start pulse source 35 and And gate 42 drives the other input. It has two inputs; one is from the first tape "running-forward" signal source 44 and the second input is from the "new word-marker" signal source 46. As previously explained, this latter source indicates the commencement of a new word on the first tape. The other And gate 38, which drives the fill flip-flop to its reset condition of stability also has as its input a clock pulse from the source 22 and the output from Or gate 40.

Another means for energizing the shift-pulse generators of the respective registers is provided. In each case, this consists of an And gate 48A, 48B, and 48C. These And gates are each connected to the respective Or gates 24A, 24B, and 24C. The input to And gate 48A consists of an output from the first counter when it is not in its "1" condition, which is designated as $C=\overline{1}$. A second input is received from the second counter when in its first count condition. This is designated as C=11. A third input, which is common to all of these And gates, is received from an And gate 50, whose inputs will be subsequently described. And gate 48B receives as its other two inputs an output from the first counter when it is not in its second count condition, designated as $C=\overline{2}$, and an output from the second counter when it is in its second count condition, designated as C=12.

And gate 48C has as its other two inputs output from the first counter when it is not in its third count condition and an output from the second counter when it is in its third count condition. And gate 50 has one input from a writing-gate signal source 52. This is generated and synchronized with a clock pulse when the decision has been made to write. It can come from the signal required to enable the writing amplifiers (not shown). The other input to the And gate 50 is the output from an "empty" flip-flop 54 when it is in its "1" or set condition. Flip-flop 54 is driven to its set condition by the output from a first And gate 56. And gate 58 provides the drive to reset the flip-flop to its reset condition. The inputs to And gate 56 consist of a clock pulse from the source 22 and a "word-start" signal from a source 60. This "word-start" signal source 60 is different from the "new-word" marker source 46. It is a signal indicating the beginning of a word to be written on the second tape. It may be generated from a clock pulse in systems where all words start at the same time as controlled from a master clock, or it may be generated by recognizing the beginning of a word to be transferred out of a register onto the second tape. The "new-word" marker signal is on the first tape and is a mark to indicate where read-out into the registers is to commence. The inputs to And gate 58 consist of a clock pulse from the source 22 and a signal from the "end-writing-word" signal source 62. This has been defined previously. The remaining structure shown in Figure 1 will be described after a description of Figures 2, 3, and 4 in order to afford a better understanding of its operation.

Figure 2:
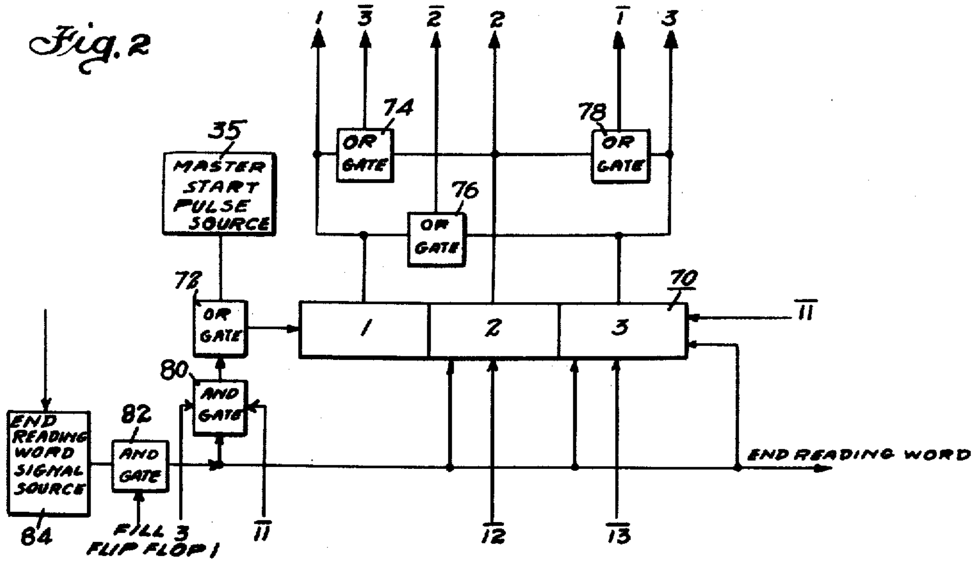
Figure 2 is a block diagram of a first counter employed with an embodiment of the invention.

Figure 2 is a block diagram of the first counter 70. The respective counter stages may be, for example, the well-known flip-flop stages which have two conditions of stability; as the count progresses, each counter stage, in turn, is set in its second condition. Thus, initially, all stages are in their first condition of stability. Stage 1, when it receives an output from the master-start Or gate 72, is driven to its second condition of stability and provides an output, designated as "1," and two other outputs through Or gates 74 and 76, which are respectively designated as $\overline{3}$ and $\overline{2}$. These, as previously explained, respectively indicate that the counter is not in its third count condition and is not in its second count condition. When the second stage of the counter 70 receives triggering impulses, the first stage is reset to its first condition of stability. Likewise, when the third stage of the counter is triggered into its second stable state, the second stage of the counter is reset into its first condition of stability. Counters of this type are well known in the art.

The outputs from the second and third stages of the counter are shown by the arrows leading from the rectangles. From the second stage there is received the second output and, through Or gates 74 and 78, the $\overline{3}$ and $\overline{1}$ outputs. Counter stage three provides a third count condition output, shown as 3, and, through Or gates 76 and 78, respectively, a $\overline{2}$ and a $\overline{1}$ output. Or gate 72 receives an input either from a master-start pulse source 35 or from an And gate 80. This And gate has three inputs: one is from an And gate 82, the second is from the third stage of the first counter, and the third is from either the second or third stage of the second counter shown in Figure 3. This is designated as $\overline{11}$. And gate 82 has an input from the end of the "reading-word" signal source 84, which was previously described, and from the fill flip-flop 32 when in its 1 state. This fill flip-flop is shown in Figure 1.

Accordingly, the first stage of the counter is turned on by a pulse received from the Or gate 72. The second stage of the counter, as well as the third stage of the counter, also have as one input the signal from the And gate 82, which is driven by "end-of-reading-word" signal source 84 plus the fill flip-flop output. The second required input to drive the second stage of the counter is the $\overline{12}$ output from the second counter. The second required input to the third stage of the counter is the $\overline{13}$ output of the second counter. To reset the third stage of the first counter to its initial or first stable state, an output from And gate 82 and from the second counter in the form of $\overline{11}$ is required.

Figures 3, 4:
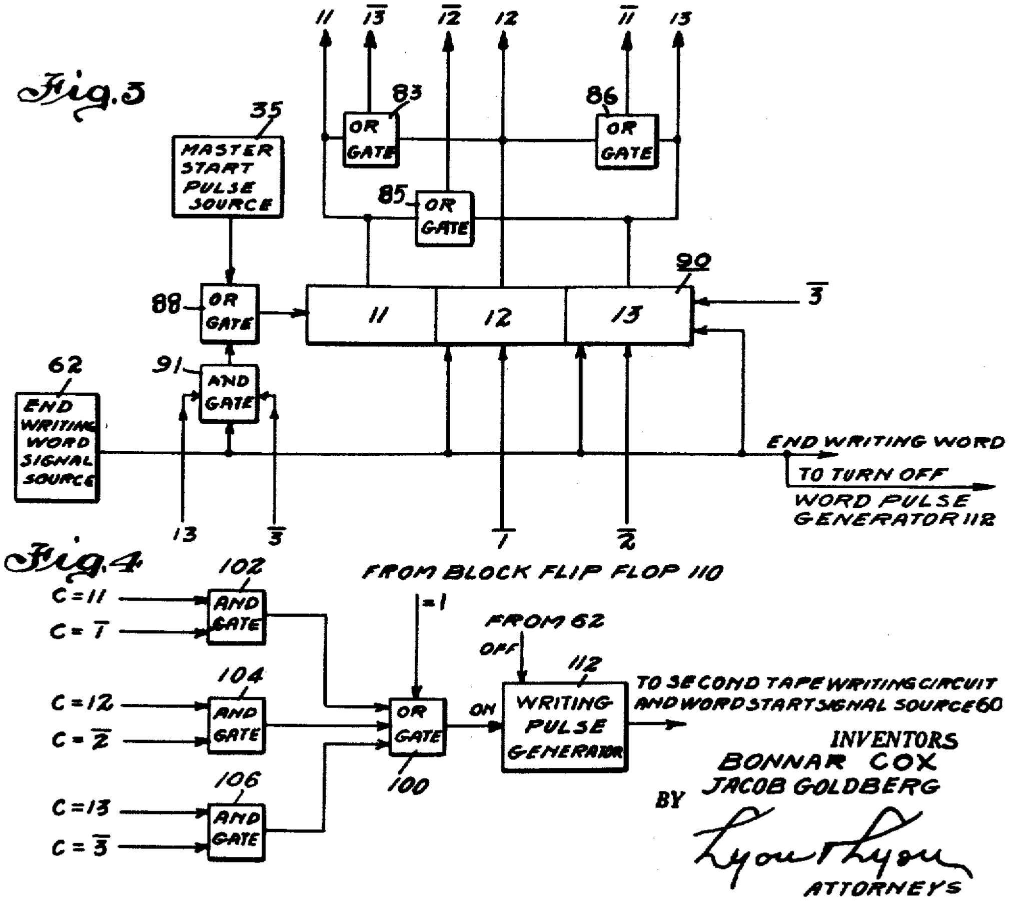
Figure 3 is a block diagram of a second counter employed with an ambodiment of the invention.
Figure 4 is a block diagram of a logical arrangement initiating the generation of writing pulses which is employed with the embodiment of the invention.

Referring now to Figure 3, the second counter 90 is similar to the first counter. It also consists of three flip-flop stages 11, 12, and 13, each having a first and second stable condition. The outputs of the first stage are designated as 11, and, also, through Or gates 83 and 85, respectively, as $\overline{13}$ and $\overline{12}$. The outputs of the second stage are designated at 12, and, through Or gates 83 and 86, are respectively designated at $\overline{13}$ and $\overline{11}$. The outputs of stage 13 are designated as 13, and, through Or gates 85 and 86, are designated as $\overline{12}$ and $\overline{11}$. The first stage is established in its second stable condition by an output from an Or gate 88. This Or gate is driven either from the master-start signal source 35 or from an And gate 91. And gate 91 has three inputs: one, from the "end-writing-word" signal source 62, the second from counter stage 13, and the third from the first counter, which is designated as $\overline{3}$.

The inputs to the second stage of the counter to drive it to its second condition of stability are, first, from the "end-writing-word" signal source, and, second, from the first counter, designated as $\overline{1}$. Counter stage 13 has the input from the "end-writing-word" signal source and also $\overline{2}$, both of which are required to drive it to its second condition of stability. Also, "end-writing" signal source and $\overline{3}$ input are employed to transfer the third stage of the second counter to its first condition of stability. Signals from the "end-writing-word" signal source are also employed to turn off a word-pulse generator 112 shown in Fig. 4.

Referring to Figure 4, the word-pulse generator 112 consists of a very precise source of pulses which can be triggered on by an output from Or gate 100 and can be triggered off by an output from the "end-writing-word" signal source. These pulses are used in combination with data from the registers for writing on the second tape. They are actually the pulses which are applied to control the writing apparatus to write the data coming from the registers to the second tape. Three And gates 102, 104, 106, as well as a set output from block flip-flop 110, which is shown in Figure 1, provide inputs to Or gate 100. Word-pulse generator 112 is turned on whenever data is being transferred out of the registers and onto the second tape. The logic of its input or commencement of operation is selected to indicate either that the first and second counters are not in conflict or that the counters are in the type of conflict that requires further clearing of the registers before new information can be transferred therein from the first tape. And gate 102, accordingly, has two inputs, one from the 11 stage of the second counter and the other designated as $\overline{1}$ from the first counter. And gate 104 has one input from the second or 12 stage of the second counter and the other from the first counter, designated as $\overline{2}$. And gate 106 has one input from stage 13 of the second counter and from the first counter, designated as $\overline{3}$. In the event that the word-pulse generator 112 is not turned on, the registers will not transfer out data.

There now follows a description of the operation of the invention. Assume that an impulse is provided from the master-start pulse source 35. This may be done by pressing a button to generate a pulse or from other apparatus which controls the transfer of data between tapes. The effect is to place stages 1 and 11 of the first and second counters in their second state of stability. And gate 34 drives fill flip-flop 32 to the set condition as soon as a clock pulse is received from source 22. And gate 28 is opened by receiving a signal from the read-gate source and, in combination with the output from the 1 stage of the first counter, opens And gate 26A. Through Or gate 24A, an output is applied to enable shift-pulse generator 20A to provide a shift pulse upon receiving a pulse from the clock-pulse source 22. The first tape provides data which is entered into register RA. As clock pulses are provided from source 22, data is transferred from the tape in synchronization therewith. Since only register RA received shift pulses, no data is transferred into registers RB and RC, although the input to these registers is in parallel.

When a word has been completely transferred into register RA, an "end-of-reading-word" signal is received. As the fill flip-flop is still in its set condition, the first counter will be driven to its second count condition, designated as C=2. This terminates shift pulses from the generator 20A and initiates shift pulses from the generator 20B. Register RB then loads up from the first tape. Again, when an "end-of-reading-word" signal is received, the first counter will be transferred to its third count condition, since the other input required for this to occur, namely, $\overline{13}$, it still being provided from the second counter. The shift-pulse generator 20B is then rendered inoperative, and shift-pulse generator 20C commences to operate. Register RC then fills up with a new word. At the end of the word, an "end-reading-word" signal is again received.

In starting the transfer from registers to second tape, a "word-start" signal is derived. The word-start signal is derived from the first output pulse of the word-pulse generator 112. This is gated on by any of the And gates 102, 104, 106, through Or gate 100. At the start of transfer, And gate 102 will be energized as soon as the first counter leaves its first state, upon filling RA. This will energize the $\overline{1}$ signal, while the second counter has been resting in C=11. Thus, And gate 48A receives the signals required for it to initiate operation of the shift-pulse generator 20 for the register RA. The "empty" flip-flop 54 is driven to its set condition as a result of receiving, through And gate 56, a timing signal from the "word-start" signal source 60 and a pulse from clock-pulse source 22. The writing-gate signals 52 may be obtained as previously indicated or even from word-pulse generator 112. The first counter is in the condition with its second stage in the second stable state and, therefore, provides the required C=$\overline{1}$ output. The second counter is in a condition with its first stage in the second stable state and, therefore, provides the C=11 output. The output from the register RA is applied through an And gate 130 to an Or gate 132. And gate 130 requires two inputs C=11 and C=$\overline{1}$, similar to those applied to And gate 48A. The third input is the output from register RA. The output from Or gate 132 is applied to the writing circuits for the second tape.

At the completion of the transfer of a word to the second tape, an "end-of-writing-word" signal is indicated which is used to transfer the second counter to its second count condition. The other required input for this occurrence, namely $\overline{1}$, is provided from the first counter. When this occurs, shift-pulse generator 20B is actuated. The output of register RB passes through an And gate 134, to which is applied an output from the second stage of the second counter C=12 and C=$\overline{2}$ from the first counter. Transfer of information from register RB to the second tape occurs clocked by pulses from pulse source 22. At the "end-of-a-writing-word" signal from source 62, the second counter is transferred to its third count condition. This enables register RC to transfer its data through And gate 136 to the second tape. And gate 136 has as its required inputs C=13, C=$\overline{3}$, and output from register RC. For each word emptied, an "end-writing-word" signal is received which triggers flip-flop 54 (the empty flip-flop) to its reset condition. However, the setting of the empty flip-flop occurs at the beginning of each new word if conditions at the input to the word-pulse generator 112 are proper. When RC is emptied, the second counter cycles back to its first state, provided the first counter is not still filling RA, as evidenced by lead $\overline{1}$. The cyclic operation of the two counters continues until such time that the counters call for the simultaneous filling and emptying of the same register, as indicated by the output of Or gate 40. This latter condition is called "lockup" and will be described in a later paragraph.

At the "end-of-the-reading-word" signal 84, if the first counter=1 and the second counter=12 at And gate 120, or if the first counter=2 and the second counter=13 at And gate 122, of if the first counter=3 and the second counter=11 at And gate 124, this is evidence that the first counter is about to move into a state which will call for the filling of a register which is under emptying control of the second counter. In this circumstance, the first counter is inhibited from advancing by virtue of one of the $\overline{11}$, $\overline{12}$, $\overline{13}$ conditions applied on the different counter states, the old tape is required to be marked, reversed and stopped by the output of Or gate 40, the fill flip-flop 32 is reset, and the block flip-flop 110 is set.

Referring to Figure 1, Or gate 40 receives an output from three And gates, respectively designated as 120, 122, and 124. These And gates provide the logic which determines when read-in from the first tape to the registers should cease. Accordingly, And gate 120 has as its two inputs output from the 1-stage of the first counter and the 12-stage of the second counter. And gate 122 has as its input outputs C=2 and C=13. And gate 124 has as its input C=3 and C=11. When any of these And gates is energized, this indicates that the system is about to attempt a filling of a register presently being emptied. This represents a lockup condition, and an output is provided through Or gate 40 and through And gate 38 when the next clock pulse is received from source 22, to drive the fill flip-flop to its reset condition.

The output from Or gate 40 also drives a block flip-flop 110 to its set condition. The writing word-pulse generator 112, whose operation was initiated by the counters attaining the C=11–C=$\overline{1}$ condition, is continued by the application of the output through Or gate 100 so that data remaining in any registers after a lockup occurs may be emptied. Also caused to occur is the following, responsive to an output from Or gate 40. A mark, called the "new-word" marker, is placed on the first tape at the position where the last bit read occurs. Then, the first tape is reversed and run backwards and stopped at such a point that when instructed to run forward again, the reader will observe the symbol indicating the last reading point. This distance is determined only by the acceleration characteristics of the tape transport mechanism. Any mark indicating an earlier reading interruption which may be in the vicinity of the new interruption is erased during the reverse motion. The tape is then run forward. It will be appreciated that the time required for these operations to occur is sufficient to empty the registers onto the new tape and bring the first tape back to the "new-word" marker. The signal provided by Or gate 40 can be used to initiate these operations in any number of ways well known in the art. One can be to trigger a 4-stage ring counter so that each stage provides a pulse which (1) writes the "new-word" marker, (2) reverses the tape, (3) erases the marker region while running back, and (4) runs the tape forward after sufficient space has been allowed for forward acceleration to the point of interruption.

At this time, it will be appreciated that the contested register and the other two registers still must be emptied. This is accomplished by the advancing of the second counter as previously described, with one exception, the second counter will arrive at the same state as the first counter, which was rendered immobile by its failure to advance upon the last "end-read" pulse. This means than none of the And gates 102, 104, 106 (which usually initiate writing pulses) will be active, since none of the following pairs of conditions exist: $C=11$ and $C=\overline{1}$, $C=12$ and $C=\overline{2}$, or $C=13$ and $C=\overline{3}$. The block flip-flop 110, however, does energize Or gate 100, and permits emptying of the last word. At the end of this last word, the block flip-flop 110 is reset and the second tape is stopped to await resumption of continuous transfer.

This may better be seen by regarding And gates 140, 142, and 144. These And gates have as a common input a signal from the "end-writing-word" signal source. And gate 140, in addition, requires inputs C=1 and C=11. And gate 142 requires input C=2, C=12, and And gate 144 requires inputs C=3 and C=13. And gate 144 is the one which provides an input to Or gate 146. This Or gate applies its output to the block flip-flop 110, to establish it in the reset condition and to stop the new tape from running further forward.

After the registers have emptied following the lockup, both tapes are instructed to run forward and resume transfer. This is done as follows. As the first tape runs forward, it will read the mark indicating the last point of interruption of reading. The tape new-word-marker signal source 46, together with a signal indicating that the tape is running forward from signal source 44, energizes And gate 42, which in turn energizes Or gate 36, thence And gate 34, which sets the fill flip-flop. This resumes the reading of the first tape immediately into whichever register is chosen by the first counter. At this time the two counters are in identical states, but that may be either the first, second or third. The counters resume their cyclic operation, and it should be appreciated that it is not necessary to resume operation only from the C=1 and C=11 states.

Accordingly, data will again be transferred into register RA, RB or RC, and the system will again cycle, filling the registers and then emptying them onto the second tape. The logic applied to And gates 120, 122, and 124 terminates the storage of data into the registers and sets up the first tape for the subsequent transfer out of data. The logic of And gates 140, 142, and 144 terminates the writing of data onto the second tape. The logic of register selection for read-in of data is provided by the first counter, and the logic for read-out of information from the registers is provided by the second counter. The output logic of the respective counters also insures the prevention of read-out from empty registers or read-in to filled registers. The logic of And gates 102, 104, and 106 which is used to drive the word-pulse generator prevents those situations where read-out of information is not sufficiently fast to clear the registers before read-in commences.

Accordingly, there has been described and shown above a system of temporary storage for data being transferred from one tape to a second tape. The process of transfer also is employed to reclock the data transferred out, to correct for any skew errors, and, by virtue of the control afforded by the clock-pulse rate, can space the data being rewritten to have any desired interval of packing. The data is also reclocked to reshape the pulses being recorded.

We claim:

1. Apparatus for transferring digital data from a first tape to a second tape comprising a plurality of separate digital data storage registers, means to transfer data from said first tape to each of said separate digital data storage registers, means to order the sequence in which said plurality of registers receive the data which is transferred, means to transfer data from each of said plurality of registers to said second tape, means to order the sequence of said plurality of registers from which said data is transferred to said second tape, means to prevent transfer of data into one of said plurality of registers when data is being transferred out of that register, and means to prevent transfer of data out of one of said registers when data is being transferred into that register.

2. Apparatus for transferring digital data from a first tape to a second tape comprising a plurality of separate digital data storage registers, means to transfer data from said first tape to each of said registers, first means to order the sequence in which said plurality of registers receive the data which is transferred, means to transfer data from each of said plurality of registers to said second tape, second means to order the sequence of said plurality of registers from which said data is transferred to said second tape, means responsive to predetermined ordering arrangements of said first and second means to inactivate said means to transfer data into said register until said first and second means differ from said predetermined ordering arrangements, and means responsive to other predetermined ordering arrangements of said first and second means to inactivate said means to transfer data from said plurality of registers until said first and second means differ from said other predetermined ordering arrangements.

3. Apparatus as recited in claim 2, wherein said first means and said second means includes a first counter and a second counter each having as many count conditions as there are registers, each count condition being associated with a different one of said registers, means responsive to transfer of a desired amount of data into a register to transfer said first counter to a succeeding count condition, and means to advance said second counter to a succeeding count condition responsive to the completion of the transfer of data from a register to said second tape.

4. Apparatus for transferring data from a first tape to a second tape comprising a plurality of registers, a first and a second counter each having as many different count conditions as there are registers, each count condition being associated with a different register, means to transfer data from said tape to the one of said registers associated with the count condition of said first counter, means responsive to the entry of a desired amount of data in a register to transfer said first counter to a succeeding count, means to initiate the writing of data onto said second tape from the register associated with the count condition of said second counter, means to advance said second counter to a succeeding count condition responsive to the completion of the transfer of data from a register to said second tape, means responsive to said first and second counters attaining a first predetermined count condition relationship to (1) terminate the filling of said registers from said first tape, (2) identify on said first tape the position from which data should be read for a succeeding operation, and means responsive to said first and second counter attaining a second predetermined count condition to terminate the writing of data on said second tape.

5. Apparatus for transferring data from a first tape to a second tape comprising a plurality of registers, a first and a second counter each having as many different count conditions as there are registers, each count condition being associated with a different register, means to transfer data from said tape to the one of said registers associated with the count condition of said first counter, means responsive to the entry of a predetermined amount of data in a register to transfer said first counter to a succeeding count, means to initiate the writing of data onto said second tape from a register associated with the count condition of said second counter, means responsive to a completion of the transfer out of data from a register to said second tape to advance said second counter to its succeeding count condition, means to reclock said data being written on said second tape, means responsive to said first counter attaining a count condition associated with one of said registers and said second counter being in a count condition associated with the succeeding one of said plurality of registers to (1) terminate the further filling of said registers from said first tape, (2) to mark the termination point of the transferred data on said first tape, and means responsive to said first and second counter attaining a count condition associated with the same one of said registers to terminate the writing of data on said second tape.

6. Apparatus for transferring data in the form of coded words from a first tape to a second tape comprising a plurality of registers, a first and a second counter each having as many different count conditions as registers, each of said count conditions being associated with a different register, means for transferring coded words from said first tape to the register associated with the first counter count condition, means responsive to an end of a transferred coded word and to said second counter having other than a predetermined count condition to advance said first counter to a succeeding count condition, means to initiate operation of said word-pulse generator, means to record data clocked by said word-pulse generator on said second tape from the register associated with the count condition of said second counter, means responsive to an end of a recorded coded word and to said first counter having other than a predetermined count condition to advance said second counter to a succeeding count condition, means to generate a signal pulse responsive to an end of a coded word and to said first and second counters having a count condition respectively associated with succeeding registers, means to mark the end of the last word read on said first tape responsive to said signal pulse, a word-pulse generator, and means responsive to said first and second counter attaining a count condition associated with the same one of said registers to stop said second tape.

7. Apparatus as recited in claim 6 wherein the predetermined count condition in said means responsive to an end of a transferred coded word and to said second counter having other than a predetermined count condition to advance said counter to a succeeding count condition is a count condition of said second counter which is associated with the same register as the one associated with the count condition to which said first counter is to be transferred.

8. Apparatus as recited in claim 6 wherein the predetermined count condition in said means responsive to an end of a recorded coded word and to said first counter having other than a predetermined count condition to advance said counter to a succeeding count condition is a count condition of said first counter which is associated with a register preceding the one with which the count condition to which said second register is to be transferred is associated with.

9. In apparatus for transferring data in the form of coded words from a first tape to a second tape a temporary storage system comprising a plurality of shift registers, a separate normally inactive shift-pulse generator for each of said shift-pulse registers, a first counter and a second counter, each of said counters having as many count conditions as registers, each count condition being associated with a different register, a source of writing-gate signals, a source of reading-gate signals, a first means to actuate a shift-pulse generator for a register responsive to said first counter being in its associated count condition and to reading-gate signals, a second means to actuate the shift-pulse generator for a register responsive to (1) said second counter being in its associated count condition, (2) said first register not being in an associated count condition, and (3) writing-gate signals, gating means for each register normally blocking transfer out of data from said register, and means to open one of said gating means to transfer data out of a register responsive to said second counter being in a count condition associated with said register and said first counter being in a count condition not associated with said register.

10. In apparatus for transferring data in the form of coded words from a first tape to a second tape as recited in claim 9 wherein there is included means for inactivating said first means including a buffer gate, a plurality of coincidence gates having their output connected to the input of said buffer gate, and means to apply to each coincidence gate a different count condition output from said first counter and a different count condition output from said second counter, said second counter count condition in each instance being associated with the register succeeding the one associated with the count condition of said first counter.

11. In apparatus for transferring data in the form of coded words from a first tape to a second tape as recited in claim 9 wherein there is included means for inactivating said second means including a buffer gate, a plurality of coincidence gates having their outputs connected to the input of said buffer gate, and means to apply to each coincidence gate a different count condition output from said first counter and a different count condition output from said second counter, said first and second counter count condition in each instance being associated with the same register.

References Cited in the file of this patent

UNITED STATES PATENTS

| | | |
|---|---|---|
| 1,559,251 | Harper | Oct. 27, 1925 |
| 2,225,680 | Boswau | Dec. 24, 1940 |
| 2,540,654 | Cohen | Feb. 6, 1951 |
| 2,614,169 | Cohen | Oct. 14, 1952 |
| 2,680,240 | Greenfield | June 1, 1954 |
| 2,702,380 | Brustman | Feb. 15, 1955 |
| 2,712,128 | Woodruff | June 28, 1955 |
| 2,798,216 | Goldberg | July 2, 1957 |